United States Patent [19]

Robbins et al.

[11] 4,340,228

[45] Jul. 20, 1982

[54] NUMBER GENERATING DEVICE AND GAMING APPARATUS INCORPORATING SAME

[76] Inventors: Edward L. Robbins, 542 Marilyn Dr., Mandeville, La. 70448; Robert S. Forster, 22 Wisteria La., Tchefuncta Estates, Covington, La. 70433

[21] Appl. No.: 260,833

[22] Filed: May 5, 1981

[51] Int. Cl.[3] .......................... A63F 5/02; G09B 23/02

[52] U.S. Cl. ............................ 273/138 R; 273/141 R; 273/274; 434/188

[58] Field of Search ............... 273/138 R, 141 R, 274; 434/188

[56] References Cited

U.S. PATENT DOCUMENTS

| | | | |
|---|---|---|---|
| 503,942 | 8/1893 | Buchanan | 273/138 R |
| 1,947,772 | 2/1934 | Harris | 273/138 R |
| 2,789,371 | 4/1957 | Shanhouse | 434/188 |
| 3,419,972 | 1/1969 | Kitzinger | 434/208 |
| 4,048,731 | 9/1977 | Baguioro | 434/188 |

*Primary Examiner*—Anton O. Oechsle

*Attorney, Agent, or Firm*—Larson and Taylor

[57] ABSTRACT

A gaming apparatus and method are provided which utilize a number generating device for generating numbers which are statistically predictable in the long run. The device includes a plurality of screening devices arranged in vertically spaced relationship to form n levels and including holes therein through which spherical objects, such as marbles fall, when dropped through the uppermost level. The holes are arranged to provide a Binomial distribution of the objects in receptacles associated with each hole of the $n^{th}$ level screening device. A number is associated with each receptacle and scoring is based on multiplying the number of objects in a receptacle by the number associated with the receptacle. Spinners determine the number of objects to be played and the target value to be reached during a turn in order to amass a positive score.

7 Claims, 6 Drawing Figures

FIG. 1
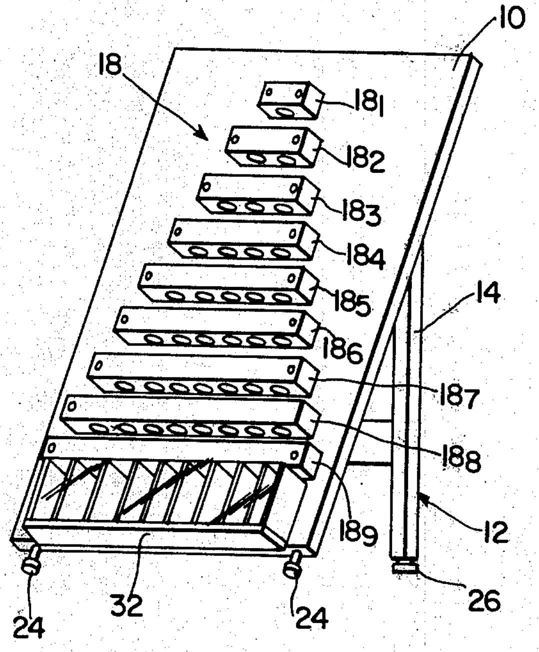
FIG. 2
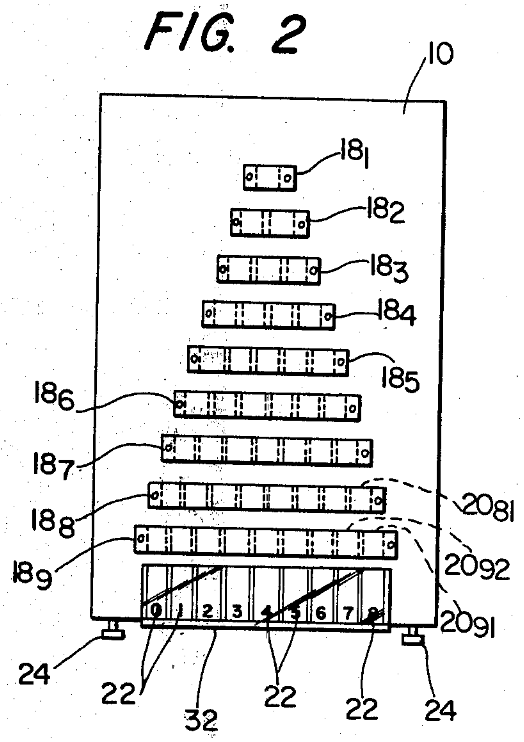
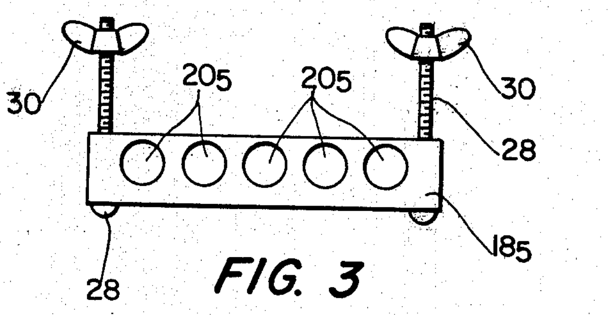
FIG. 3
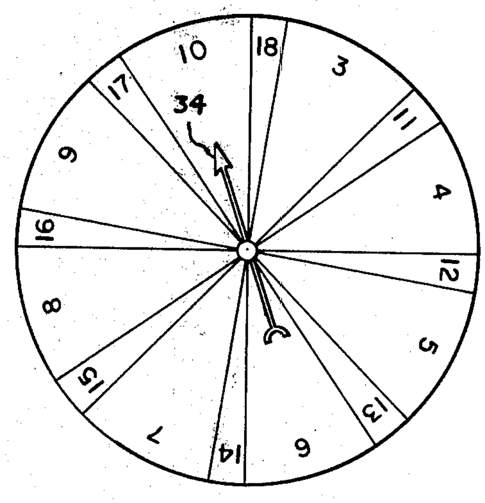
FIG. 4
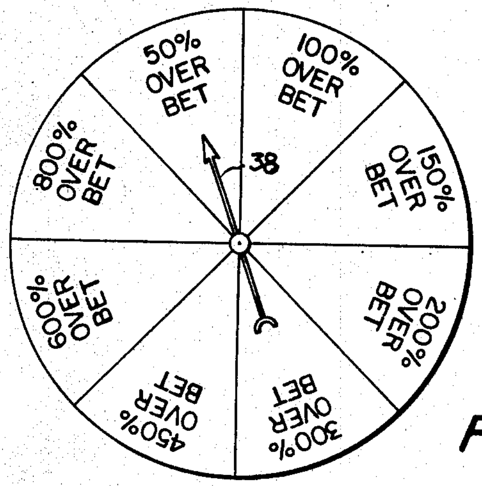
FIG. 6

NUMBER GENERATING DEVICE AND GAMING APPARATUS INCORPORATING SAME

FIELD OF THE INVENTION

The present invention relates to amusement and gaming devices and, more particularly, to an amusement or gaming device which generates a probabilistic, i.e., mathetically predictable, number and to game apparatus and a method of playing a game incorporating such a gaming device.

BACKGROUND OF THE INVENTION

Devices which distribute spheres and other objects, such as Ping Pong balls, marbles, coins and the like, into receptacles according to a probability law, and in particular, the Binomial law of probability distribution, are known in the art. These devices take a number of forms. Some examples of such devices are shown in the following patents: U.S. Pat. Nos. 503,942 (Buchanan); 573,076 (Drobisch); 592,004 (Ebersole); 641,861 (Huestis); 768,300 (Probes); 1,947,772 (Harris). The devices disclosed in these patents utilize pins which deflect coins, balls or other object dropped into the device from the top and provide for collection of the objects after deflection. In the device of the Buchanan patent, plates are employed which form passages for the object. Similar devices have been used to demonstrate the Normal or Bell curve distributions associated with probability theory.

SUMMARY OF THE INVENTION

In accordance with the invention, a device is provided which, as noted above, serves to generate a mathematically predictable number and to a game apparatus, and a method of playing a game, utilizing such a device. The device of the invention employs a plurality of longitudinally extending, vertically spaced screens having vertical holes therein and, among other advantages, enables the generation of mathematically predictable numbers with greater precision than the devices of the prior art described above wherein balls or the like hit pins as they freely travel down a backboard on which the pins are located. The gaming apparatus of the invention includes spinner devices which are used in generating other numbers used in playing the game of the invention. The game itself is perhaps best understood from a consideration of an exemplary embodiment thereof discussed below and thus will not be described here.

It will be appreciated that, apart from use in the game of the invention, the number generating device of the invention can be used for other purposes such as an educational device to be used, for example, in classes in statistics and probability, in illustrating the Binomial probability distribution and Normal probability distribution. Moreover, the device can be used as a random number generator wherein the numbers to be generated are predictable statistically.

Other features and advantages of the invention will be set forth in, or apparent from, the detailed description of the preferred embodiment thereof which follows.

BRIEF DESCRIPTION OF THE DRAWINGS

FIG. 1 is a perspective view of a number generating device constructed in accordance with a preferred embodiment of the invention;

FIG. 2 is a front elevation of the device of FIG. 1;

FIG. 3 is a plan view of one of the screening devices of the embodiment of FIG. 1; and FIGS. 4 to 6 are plan views of spinner devices which form part of the gaming apparatus of the preferred embodiment of the invention.

DESCRIPTION OF THE PREFERRED EMBODIMENTS

Figure 5:
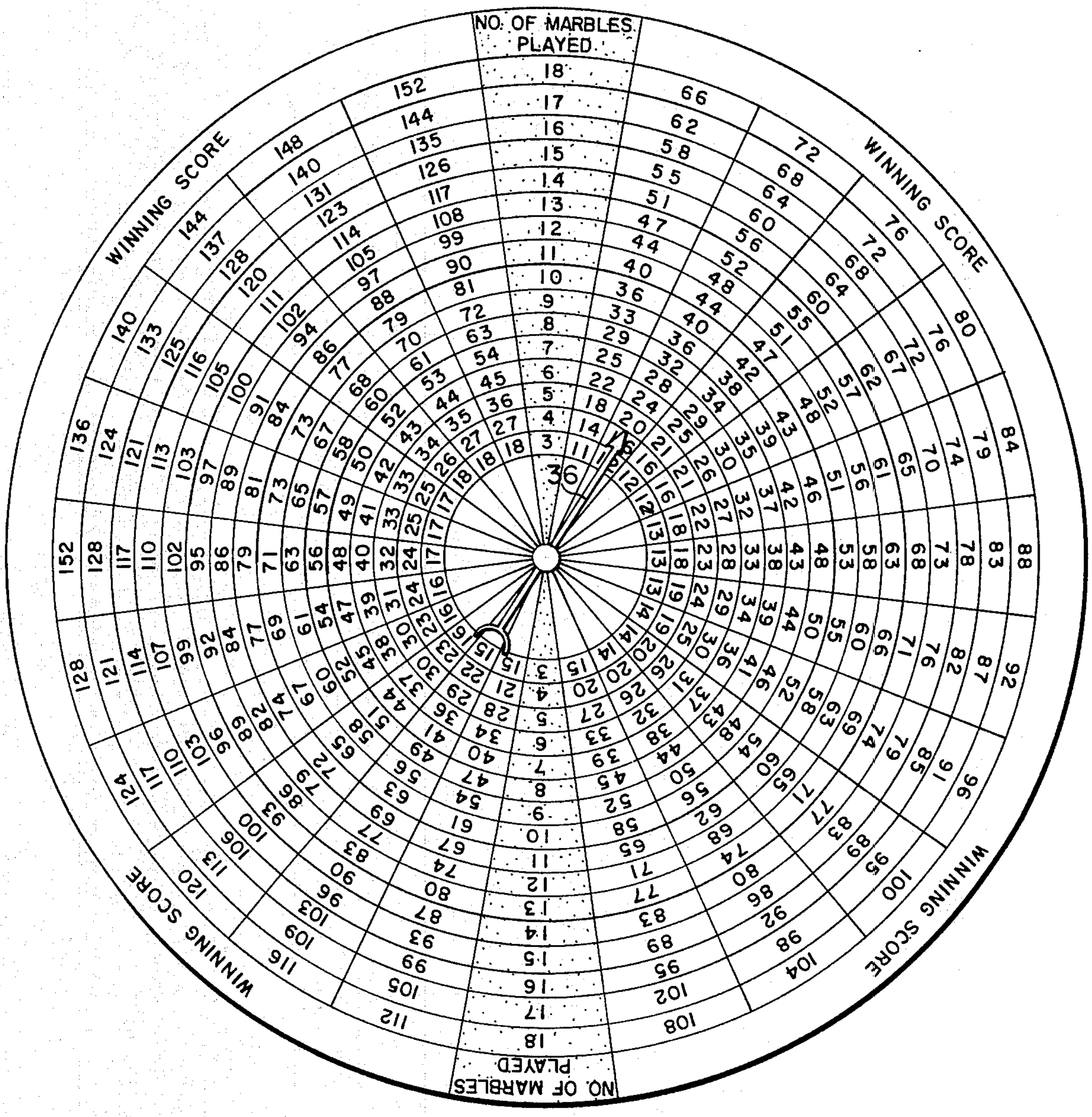

Referring to FIGS. 1 and 2, a preferred embodiment of the principal component of the gaming apparatus of the invention is shown. This component, the number generating device, comprises a generally planar support member or backboard 10. A pivotable support or backstand arrangement, generally denoted 12, comprises a pair of support arms, only of one which, denoted 14, is shown. The support arms are joined together by a horizontal bracing strut 16 and are pivotably connected to the back of backboard 10 so that backboard 10 can be tilted at an angle to vertical. The angle of tilt is preferably between about 5 and 30 degrees.

A plurality of object screening members or screens, generally denoted 18, are affixed to backboard 10. In the embodiment under consideration, the screens 18 are formed by elongated block-like members which disposed parallel to horizontal and which are equally spaced vertically to form a plurality of levels. In the exemplary embodiment, nine levels, formed by nine screens denoted $\mathbf{18_1}$ to $\mathbf{18_9}$ are provided. The first, i.e., uppermost level screen $\mathbf{18_1}$, has a single central vertically oriented hole $\mathbf{20_1}$ located therein through which a spheroidal object e.g., a marble, ball or the like, can be dropped. Although any suitable object of a spherical shape can be employed, these objects will, for convenience, be generally referred to as marbles throughout the following discussion. The second level screen $\mathbf{18_2}$, which is disposed directly below screen $\mathbf{18_1}$, contains two such vertical holes, denoted $\mathbf{20_2}$, each of the same diameter as hole $\mathbf{20_1}$. The holes $\mathbf{20_2}$ of the second level screen $\mathbf{18_2}$ are located symmetrically with respect to the center line of hole $\mathbf{20_1}$, equidistant therefrom. With this arrangement, a marble dropping through hole $\mathbf{20_1}$ has an equal probability of landing in either of the two holes $\mathbf{20_2}$ in screen $\mathbf{18_2}$.

In the generalized case, a screen 18 of the level n has n such vertical holes of the same diameter as those of the other levels. Thus, referring to FIG. 3, which is a plan view of the fifth level screen $\mathbf{18_5}$, five equally spaced, equidiameter holes $\mathbf{20_5}$ are provided. Further, the holes of the n-level screen are positioned such that a marble dropping through a hole in the $n-1$ level will have an equal opportunity to drop through the two holes in the $n^{th}$ level which are positioned symmetrically below the $n-1$ level hole. For example, the marble dropping through the first hole $\mathbf{20_{81}}$ in the eighth level screen $\mathbf{18_8}$ will have an equal opportunity of falling through either of the first two holes $\mathbf{20_{91}}$ and $\mathbf{20_{92}}$ in the ninth level screen $\mathbf{18_9}$.

Located immediately below the lowermost screen $\mathbf{18_9}$ are a series of receptacles or buckets, generally denoted 22, in which are received the objects which fall through the screens 18. The number of buckets 22 is equal to the number of holes in the lowermost screen $18_9$ (in this case, nine) with each bucket 22 being positioned directly below a corresponding one of the holes $20_{91}$ to $20_{99}$. A clear front panel, made of glass, clear plastic or the like, covers the front of the bucket 22, so that a player can view the marbles as they drop from the last level screen $18_9$ into the respective buckets and and to assist in maintaining the marbles in the respective buckets until the marbles are deliberately removed by the technique discussed below.

In order to provide proper performance, the screens must be level and properly positioned with respect to each other. To facilitate this, leveling devices of the adjustable leveling screw type, denoted 24, are located at the bottom of backboard 10 and further such leveling devices (one of which, denoted 26, is shown in FIG. 1) are located at the bottom ends of support arms 14 of the backstand arrangement 12. In addition, as shown in FIG. 3, the screens 18 is adjustably mounted on backboard 10 by means of bolts 28 and butterfly nuts 30 which can be adjusted within narrow limits. In addition, the diameter of each hole 20 is only just slightly greater than the diameter of the marbles so that the marbles fall with precision therethrough.

To enable ready removal of the objects (marbles) collected in the buckets 20, a removable panel 32 is located at the bottom of the buckets. Panel 32 may be received in guide slots (not shown) to enable the pane to slide in and out of a position beneath the buckets.

In accordance with one embodiment thereof, the gaming apparatus of the invention preferably includes a series of spinner devices shown in FIGS. 4, 5 and 6.

The spinner device shown in FIG. 4 determines the number of marbles a player can put into the "chute" formed by the apparatus of FIGS. 1 to 3 during his turn. Thus, for the position of the spinner 34 shown in FIG. 4, ten marbles would be put through.

The spinner device of FIG. 5, determines the "winning score" after the number of objects, i.e., marbles, to be played has been determined by the spinner device of FIG. 5. To explain how the game is scored and thus what the term "winning score" means, in a preferred embodiment the buckets 20 are numbered in sequence, i.e., one (1) to eight (8), as shown in FIG. 2. The number associated with a bucket multiplied by the number of marbles collected therein produces the score for that bucket. Thus, for example, where five marbles pass through the chute and one marble lands in the "2" bucket, one marble lands in the "3" bucket and three marbles land in the "4" bucket, the total score would be $(1\times 2)+(1\times 3)+(3\times 4)$ or 17. The spinner device of FIG. 5 determines the total score that a player must equal or exceed to "win" so that if the player can use 10 marbles as provided for by the "number" spinner of FIG. 4, for the position of the spinner 36 shown in FIG. 5, the winning score would be "40", as is indicated by locating the number "10" in the "no. of marbles played" column and determining the intersection with the "winning score" column indicated by the spinner 36.

The spinner device of FIG. 6 determines the "return over bet" that a player obtains when the "winning score" or higher is achieved during his turn. For the position of spinner 38 shown in FIG. 6, a return of 50% over bet is provided for so that a bet of x would return a total of 1.5x.

The general manner in which the game of the invention is played should be evident from the foregoing discussion. Any number of persons can play and to begin the game, the person whose turn it is spins the spinners of the spinning devices of FIGS. 4, 5 and 6. The player then makes a decision to bet or not to bet, based on his mental assessment of his overall chances based on (i) the probability of attaining at least the "winning score", as determined by the spinner device of FIG. 5 and based on the number of marbles to be put through the "chute" as determined by the spinner of FIG. 4, and (ii) the reward to be obtained by achieving the score, i.e., the "return over bet", determined by the spinner device of FIG. 6. It will, of course, be understood that if, for example, the "return over bet" is 800%, this can offset a relatively low probability of achieving the "winning score" and thus, that a balancing of these factors is important in deciding whether to bet or not.

If a player decides not to bet, his turn is over. If a player decides to bet, the marbles, in succession, are dropped through the hole $20_1$ of the first screen $18_1$ and will fall through the successive screens 18 so as to ultimately land in one of the buckets 22. The manner in which the game is scored in an exemplary embodiment was discussed above and, in brief, involves multiplying the number value associated with a bucket by the number of marbles collected in that bucket and totaling the "scores" for all of the buckets 22. If the total score equals or exceeds the "winning score", the player has won his bet and is entitled to the "return over bet" provided for by the spinner device of FIG. 6. Play continues until one player has amassed a particular amount of "money", i.e., where the total "scores" for his turns exceeds a predetermined amount.

As will be appreciated, mathematical strategy can be used in determining when to bet. For the exemplary embodiment under consideration wherein the buckets 22 are numbered 0 to 9 and eight, rather than nine, screens are used, the probability of landing in bucket x, based on Binomial probability distribution, is given by $$\frac{8!}{x!(8-x)!}\left(\tfrac{1}{2}\right)^8.$$

The mean score is 4 and the standard deviation is $\sqrt{2}$. For n marbles the mean total score is 4n and the standard deviation is $\sqrt{2n}$. Since the distribution of the total score approaches a Normal Distribution in the moment generating function as n becomes large, the mathematically astute player can predict the probability of a "winning score". Thus, such a player can assess, given the size of the "return over bet", whether the winnings to be expected from that bet are such as to justify the bet.

It will be appreciated that the spinner devices of FIGS. 4 to 6 can take many different forms and that, for example, the devices of FIGS. 5 and 6 can be combined in a single spinner device so that the "winning score" and "return over bet", based on the number of marbles to be put through the "chute" are, inextricably linked. In this way, the odds of "winning" can be set to, for example, slightly favor the owner of a gaming establishment. Further, plugs or stoppers can be used to block or plug up one or more of the holes in the screens and thus divert the marbles to other holes. This will, of course, convert the eventual probable distribution of the marbles into a distribution other than Binomial. The use or non-use of such stoppers can be incorporated in the game or different games can be devised with different numbers and placements of the stoppers.

Although the invention has been described in relation to exemplary embodiments thereof, it will be understood by those skilled in the art that variations and modifications can be effected in these exemplary embodiments without departing from the scope and spirit of the invention.

We claim:

1. A gaming device for use with a plurality of spheroidal objects comprising a generally planar support member which is positioned, in use, in an angle with respect to the horizontal, a plurality screening elements which are mounted on said support member and through which the spheroidal objects pass, each of said screening elements comprising an elongate block member having at least one transverse aperture extending therethrough, each said block members being disposed on said support member such that, in use, the longitudinal axis thereof extends parallel to horizontal and being spaced from each other vertically along said support member, the number of said apertures in said block members being a function of the vertical positions thereof, and increasing by one from level to level beginning from the top, said apertures in the blocks at various vertical levels being arranged relative to the apertures in blocks at other levels such that a spheroidal object passing through a first aperture in a block member at a one level has an even chance of passing through one or the other of two apertures of the block at a level directly below said one level, means, located below the lowermost block and having a number of collecting chambers therein equal to the number of apertures in the lowermost block, for collecting in respective ones of said chambers the spheroidal objects which fall through said apertures in said lowermost block, and means for adjusting the angle of inclination of said support member.

2. Gaming apparatus comprising a plurality of spheroidal objects;

a number generating device including a plurality of longitudinally extending screening elements spaced vertically to form n levels, the screening elements of the n levels including a number of holes therein equal to the number of the level beginning with a single hole in the uppermost level screening element, receptacle means associated with each of the holes of the n-level screening element, for collecting the objects as they pass through the respective holes of the n level screening element, said holes in said screening elements being arranged with respect to one another such that the objects, when put through the hole in uppermost level screening element, will be distributed in a statistically predictable pattern in said receptacle means, each of said receptacle means having a number value associated therewith; and first means for determining the number of objects to be put through the number generating device and second means for determining a target number value based on the number of objects to be put through the number generating device and the numbers associated with the receptacle means.

3. An apparatus as claimed in claim 2 further comprising third means for determining a percentage return on an amount wagered for attaining the target number value.

4. An apparatus as claimed in claim 2 wherein said first and second means comprise spinner devices.

5. An apparatus as claimed in claim 3 wherein said first, second and third means comprises spinner devices.

6. A method of playing a game wherein the odds of achieving a particular target number can be mathematically predicted, said method employing a device for generating random statistically predictable numbers by dropping spherical objects through the device and calculating a number value based on the number of objects collected in each of a plurality of receptacles having number values associated therewith, said method comprising the steps of, during each turn of the game, determining, by chance, the number of objects to be put through the device; and determining, by chance, the target number to be attained or exceeded for the number of objects to be played;

and, for each turn of the game where it is decided to proceed with that turn, putting the each of said objects in succession through the device; and calculating a score based on the sum, for all receptacles, of the product of the number of objects in each receptacle and the number associated with that receptacle, and comparing that score with the target number.

7. A method as claimed in claim 6, further comprising determining, by chance, a percentage return when the target number is attained or exceeded.

* * * * *